H. K. RAYMOND.
VALVE FOR PNEUMATIC TIRES.
APPLICATION FILED MAR. 1, 1906.

906,158. Patented Dec. 8, 1908.

WITNESSES:
Harry G. Sanders.
Oliver Williams.

INVENTOR
Harry K. Raymond
BY
Seward Davis
ATTORNEY

UNITED STATES PATENT OFFICE.

HARRY K. RAYMOND, OF AKRON, OHIO, ASSIGNOR TO THE B. F. GOODRICH COMPANY, OF AKRON, OHIO, A CORPORATION OF OHIO.

VALVE FOR PNEUMATIC TIRES.

No. 906,158.      Specification of Letters Patent.      Patented Dec. 8, 1908.

Application filed March 1, 1906. Serial No. 303,682.

*To all whom it may concern:*

Be it known that I, HARRY K. RAYMOND, a citizen of the United States, residing at the city of Akron, county of Summit, and State of Ohio, have invented certain new and useful Improvements in Valves for Pneumatic Tires, of which the following is a specification, reference being had to the accompanying drawings, which form a part thereof.

My invention relates to that class of air valves employed as means for inflating and deflating pneumatic tires.

In the present state of the art the air valve consists of a single straight tube provided at one end with a head adapted to seat against the inner surface of the air tube and containing the valve mechanism, which is usually constructed to admit air under pressure and to prevent its escape. The air tube is applied to the wheel rim when the said tube is wholly or partially deflated, the valve casing being inserted in a hole provided therefor in the rim and felly. The valve casing is then forced downward until its extremity projects beyond the inner surface of the felly, the air pump attached and air forced in to fill the tube. This form of valve presents certain serious difficulties in practice: For example, the valve casing cannot be easily forced down into place before the tire is inflated, and therefore the extremity of the tube frequently does not project beyond the felly sufficiently to allow the inflating pump to be attached. To obviate this difficulty the valve casing is usually made of a length considerably greater than the thickness of the felly requires, although this expedient introduces other serious difficulties. The length of the valve casing renders the operation of applying the tire or the inner tube and the insertion of the valve casing in its place exceedingly awkward, and may necessitate a dangerous degree of stretching of the material composing the air tube.

The object of my invention is to provide a valve which shall have a short casing to secure ease in applying the air tube and which shall have a removable extension tube sufficiently long to reach through the rim and felly.

Another object of my invention is to provide a valve adapted to be applied to rims of different thicknesses by the use of extension tubes of various lengths.

A further object of my invention is to provide a valve having a short casing and provided with means for removing the valve mechanism therefrom.

I accomplish these objects by means of the structure hereinafter described and claimed.

Figure 1:
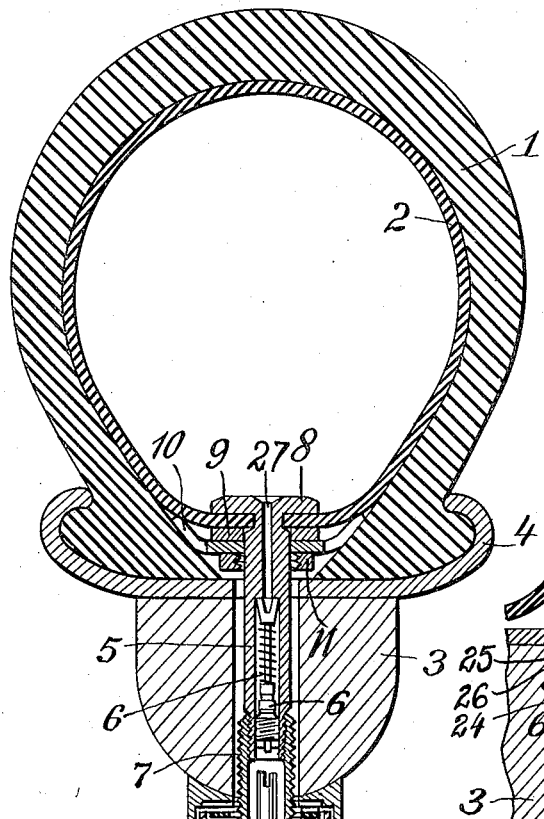
Figure 2:
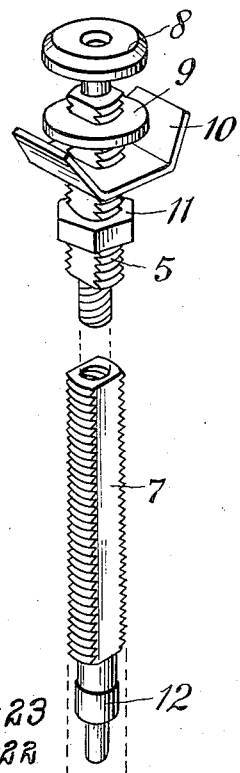
Figure 3:
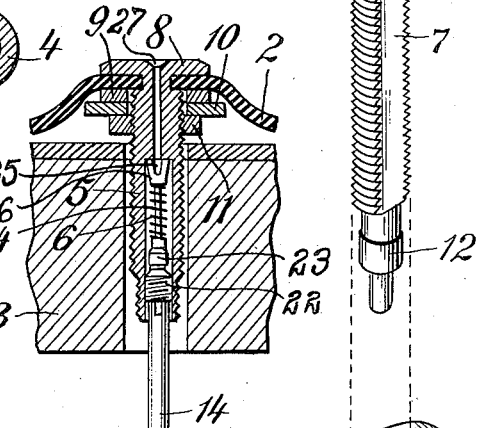
Figure 4:
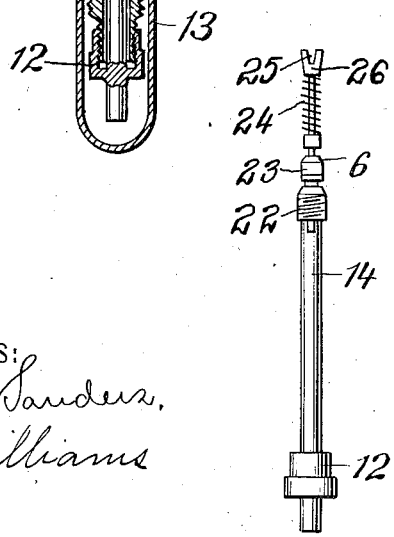

In the drawings Figure 1 is a sectional elevation of a rim, tire and felly, having attached thereto my improved tire valve. Fig. 2 is an isometric view of the several parts of my improved valve. Fig. 3 is a section in a plane at right angles to that of Fig. 1 of a felly and of the casing of my improved valve, illustrating the operation of the means for removing the valve mechanism. Fig. 4 is a detail view of the valve mechanism and the removing means.

I have shown my device as applied to a double tube tire of the clencher type, although it is equally well adapted for use with many other forms of tire and rim.

In Fig. 1, 1 is the tire casing, 2 the inner or air tube, 3 the wheel felly, and 4 the rim. The valve consists essentially of the casing 5, the valve mechanism 6 within said casing, and the extension tube 7, which is adapted to be removably attached to the said valve casing. Various methods of securing this attachment will readily suggest themselves, but I prefer to provide the lower extremity of the valve casing with a threaded tip adapted to screw into a tapped socket at the upper extremity of the extension tube. The casing and extension tube are preferably made of equal diameter and of similarly shaped cross-section, so that when the extension tube is attached, it and the casing form a substantially continuous threaded tube similar to that of the single casing used at present. The casing and the extension tube may be provided with two oppositely disposed flattened faces, as is generally done at present. The casing 5 may be provided with the usual head 8, and upon the casing may be mounted the washer 9, the clip 10, the nut 11, or similar devices, as may be needed, which, however, constitute no part of my improvement. The extension tube may be provided with the usual threaded tip of a smaller diameter than the remainder of the tube and casing to allow the application of the cap 12.

To protect the lower extremity of the valve, I provide a dust-cap 13, which may be of any desired form, although I prefer to use the type shown in the drawings, in which the upper end of the cap proper is swiveled inside a block shaped to fit accurately against the wheel felly and provided with a hole for the admission of the extension tube and shaped to correspond with the cross-section of the said extension tube, so that the edges fit closely against the flattened sides of the extension tube, and thus secure it against turning when the dust-cap is in position.

Since the valve casing is generally too short to reach through the wheel felly, some means must be provided whereby the valve mechanism can be reached when it is to be removed, in order to deflate the tire. I therefore provide the valve removing tool 14, which consists of a straight cylindrical rod of a diameter approximately equal to that of the interior of the valve casing. Its upper end is shaped to engage the valve mechanism, and is designed to remove it from its casing. If intended for use with the more common form of valve, this tip is provided with a transverse groove shaped to engage a rib upon the base of the valve mechanism, and has a centrally located socket for the admission of the valve pin. The shape of this terminal may of course be varied at will to adapt it for use with valves of various sorts. I find it convenient to make the bore of the extension tube sufficiently large to contain this tool and to join the lower extremity of the said tool to the cap 12, which, as before explained, is fitted to engage the threaded lower extremity of the extension tube and to form a cover therefor. I do not wish to be understood as limiting myself to the use of this form of extension tube having the valve removing tool located within it, for I believe to be broadly new the idea of a two-part valve tube, and the device is completely operative when it consists simply of the casing, the valve mechanism within the casing, and the extension tube attached to the said casing. The enlargement of the tube and the addition of the valve removing tool I present as a modification.

While any suitable valve mechanism may be used, I have illustrated a mechanism of the well known Schrader type, shown and described in United States Patent No. 724,128, dated March 31st, 1903. In a mechanism of this construction, the air enters through an orifice in plug 22, lifts valve proper 23 off its seat on the plug, and passes through the passage thus opened into the valve chamber. It then passes through openings 25 in spring holder 26 into the passage 27 leading to the interior of the tire. When air is not being forced through the valve, spring 24 holds valve proper 23 upon its seat and the valve is closed.

The operation of my device is as follows: The short valve casing is fixed to the air tube, the head seating within it. Below the air tube are placed the washer, clip, nut and such other accessories as may be desired. The air tube is then applied to the rim and the end of the valve casing inserted in the hole provided for it in the felly, this last operation being greatly facilitated by the shortness of the casing. The extension tube is then inserted from beneath in the hole within which the valve casing rests and is screwed thereto, thus furnishing means for pulling the valve casing downward into place. The air pump is then attached to the extremity of the extension tube and the tire inflated in the usual manner. Upon the removal of the pump, the cap 12 is attached and the dust-cap screwed up into place. To deflate the tire the dust-cap is removed, the cap 12 unscrewed and the tool withdrawn from the tube. The extension tube is then unscrewed, whereupon, by means of the tool, the valve mechanism may be removed from the casing, which will allow the air to escape. This last operation is clearly shown in Fig. 3.

Having described my invention what I claim is:

1. In a pneumatic tire valve the combination of a valve casing, a complete valve mechanism entirely contained therein, an extension tube adapted to be removably attached to said casing, and a tool for inserting or removing said valve mechanism, said tool adapted to be carried within said extension tube, substantially as described.

2. In combination with a two-piece casing for pneumatic tire valves, a tool for inserting and removing the valve mechanism, adapted to be carried within one portion of said casing, said tool comprising a straight rod having a tip adapted to enter the bore of the valve casing and to engage the valve mechanism, its other terminal attached to a cap adapted to cover the extremity of the casing and to hold the tool within said casing, substantially as described.

3. A cap for pneumatic tire valves having a tapped socket and a tool for inserting and removing the valve mechanism projecting from the interior thereof.

4. In a pneumatic tire valve, the combination of a casing, an extension tube removably secured thereto and a cap united by a screw connection to said extension tube and having a tool for inserting and removing the valve mechanism said tool occupying the space within the bore of said extension tube when the cap is in place.

5. In a pneumatic tire valve, the combination of a casing, a complete valve mechanism entirely contained therein and an extension tube exteriorly threaded throughout its length and flattened on two opposite sides independent of the valve mechanism and united to the casing by a screw connection.

6. In a pneumatic tire valve, the combination of a casing, a complete valve mechanism entirely contained therein, and an extension tube having flattened sides and removably secured to the casing, and means for locking the extension tube against rotation comprising a block having a surface curved to fit the wheel felly and an aperture shaped to fit the extension tube.

HARRY K. RAYMOND

Witnesses:
JAMES A. MCILWAIN,
ROY KEPLER.